(12) United States Patent
Schuller et al.

(10) Patent No.: US 11,827,083 B2
(45) Date of Patent: Nov. 28, 2023

(54) ROLLER BLIND ARRANGEMENT FOR A MOTOR VEHICLE

(71) Applicant: Webasto SE, Stockdorf (DE)

(72) Inventors: Daniel Schuller, Stockdorf (DE); Tobias Fritz, Stockdorf (DE); Sebastian Gering, Stockdorf (DE); Ulrich Schreiber, Stockdorf (DE); Andreas Rockelmann, Stockdorf (DE); Marian Riegger, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 523 days.

(21) Appl. No.: 16/616,037

(22) PCT Filed: May 15, 2018

(86) PCT No.: PCT/EP2018/062493
§ 371 (c)(1),
(2) Date: Nov. 22, 2019

(87) PCT Pub. No.: WO2018/219634
PCT Pub. Date: Dec. 6, 2018

(65) Prior Publication Data
US 2020/0086720 A1 Mar. 19, 2020

(30) Foreign Application Priority Data
May 30, 2017 (DE) .................... 10 2017 111 734.2

(51) Int. Cl.
*B60J 1/20* (2006.01)
(52) U.S. Cl.
CPC ............. *B60J 1/205* (2013.01); *B60J 1/2052* (2013.01); *B60J 1/2063* (2013.01)
(58) Field of Classification Search
CPC ........ B60J 1/205; B60J 1/2052; B60J 1/2063; B60J 7/0015; B60J 7/0023; B60J 1/2011;
(Continued)

(56) References Cited

U.S. PATENT DOCUMENTS 2,448,548 A * 9/1948 Purdy ....................... F16B 7/20
403/378
3,248,899 A * 5/1966 Anderson ................. E06B 9/44
160/326
(Continued)

FOREIGN PATENT DOCUMENTS

CN 110171279 A * 8/2019
DE 19900506 A1 7/1999
(Continued)

OTHER PUBLICATIONS

International Search Report for PCT/EP2018/062493 dated Jul. 13, 2018 and English Translation enclosed herewith (7 pages).

*Primary Examiner* — Daniel P Cahn
*Assistant Examiner* — Matthew R. Shepherd
(74) *Attorney, Agent, or Firm* — Fitch, Even, Tabin & Flannery, LLP

(57) ABSTRACT

A roller blind arrangement for a motor vehicle may have a roller blind web which has guiding tapes on its lateral edges on either side of a longitudinal center plane of the roller blind, a winding shaft onto which the roller blind web can be wound or from which the roller blind web can be unwound and which comprises a flexible hollow tube arrangement penetrated by a vehicle-attached mounting beam and comprising a flexible middle tube which is provided with bearing bushes in a co-rotating manner on both ends, each guiding tape of the roller blind web being attached to one bearing bush. At least one of the bearing bushes can shift relative to the middle tube in the longitudinal direction of the hollow tube.

7 Claims, 13 Drawing Sheets

(58) Field of Classification Search
CPC .............. B60J 1/2013; E06B 2009/402; E06B 2009/407; E06B 2009/2488; F16B 7/042
See application file for complete search history.

(56) References Cited

U.S. PATENT DOCUMENTS

| | | | | |
|---|---|---|---|---|
| 4,645,373 | A * | 2/1987 | Purdy | F16B 21/00 403/381 |
| 5,036,898 | A * | 8/1991 | Chen | B60J 1/2033 160/370.21 |
| 5,881,792 | A | 3/1999 | Cheng | |
| 5,934,354 | A * | 8/1999 | Price | B60R 5/047 296/37.16 |
| 11,215,007 | B2 * | 1/2022 | Schorling | E06B 9/40 |
| 11,233,349 | B2 * | 1/2022 | Mayville | H01R 13/635 |
| 2007/0051478 | A1 * | 3/2007 | Wieczorek | E06B 9/42 160/323.1 |
| 2008/0006373 | A1 * | 1/2008 | Lin | B60J 1/2025 160/265 |
| 2008/0029224 | A1 | 2/2008 | Popa | |
| 2008/0197655 | A1 * | 8/2008 | Oerke | B60J 7/0015 296/83 |
| 2018/0313147 | A1 * | 11/2018 | Krantz-Lilienthal | E06B 9/42 |

FOREIGN PATENT DOCUMENTS

| | | | |
|---|---|---|---|
| DE | 202004000631 U1 | 3/2004 | |
| DE | 102006046105 A1 | 4/2008 | |
| DE | 102013102630 A1 | 9/2014 | |
| KR | 20130061790 A * | 12/2011 | .............. F16B 7/042 |

* cited by examiner

ROLLER BLIND ARRANGEMENT FOR A MOTOR VEHICLE

CROSS-REFERENCE TO RELATED APPLICATIONS

This application is a U.S. national phase application filed under 35 U.S.C. § 371 of International Application No. PCT/EP2018/062493, filed May 15, 2018, designating the United States, which claims priority from German Patent Application No. 10 2017 111 734.2, filed May 30, 2017, which are hereby incorporated herein by reference in their entirety for all purposes.

FIELD

The invention relates to a roller blind arrangement having the features of the preamble of claim 1.

BACKGROUND

A roller blind arrangement of this kind is known from practice and serves to shade a transparent roof portion in a motor vehicle, said transparent roof portion being formed by a glass lid of a sunroof arrangement, for example. For this purpose, the roller blind arrangement comprises a roller blind web as a shading element, which may be made of a woven fabric, a knitted fabric, a film or the like and which can be wound onto a winding shaft or unwound from the winding shaft in order to shade the transparent vehicle portion in question. The winding shaft may comprise a curved, vehicle-attached mounting beam which is surrounded by a flexible hollow tube arrangement to which the roller blind web is connected at its edge extending in the transverse direction of the roller blind. The hollow tube arrangement comprises a middle tube, which forms a central portion and which is realized as a corrugated tube, for example, and which is provided with bearing bushes at its two ends on either side of a longitudinal center plane of the roller blind, the bearing bushes being mounted in a rotating manner. The roller blind web is provided with guiding tapes on its lateral edges, each guiding tape being guided in a vehicle-attached guiding rail and being attached to one of the bearing bushes. To wind up the laterally guided roller blind web, the winding shaft comprises a winding spring which pre-loads the bearing sleeve and the middle tube in the winding direction. This ensures that the roller blind web is automatically wound onto the winding shaft when a pull bar, which is attached to the front side of the roller blind web facing away from the winding shaft, is released.

The middle tube of the hollow tube arrangement of the winding shaft may consist of a plastic tube. Fluctuations in temperature and/or humidity may cause the length of the hollow tube arrangement to change, which may damage the connection between the roller blind web and the winding shaft. Moreover, the resulting stresses may lead to increased actuation forces or even wedging of the lateral guiding mechanism. The spring forces exerted by the winding spring, which act on only one of the two bearing bushes in particular, may additionally cause ripples and/or crinkles in the roller blind web and excessive one-sided wear.

The object of the invention is to provide a roller blind arrangement of the kind detailed above in which stresses in the area of the winding shaft that are due to temperature and/or humidity fluctuations are minimized.

SUMMARY

According to the invention, said object is attained by the roller blind arrangement having the features of claim 1.

The invention proposes a roller blind arrangement in which the winding shaft comprises a hollow tube arrangement having lateral bearing bushes, of which at least one can shift relative to a flexible middle tube in the axial direction, allowing changes in the length of the middle tube due to temperature and/or humidity to be compensated without any excessive stresses being introduced into the roller blind web and without any adverse effects on the function of the roller blind arrangement. The at least one bearing bush that can shift axially in relation to the middle tube is connected to the middle tube via an axial sliding connection, in particular. The sliding connection makes the length compensation possible. At the same time, moments of torsion can be transmitted between the middle tube and the bearing bush since they are connected for co-rotation.

In a preferred embodiment of the roller blind arrangement according to the invention, to connect the bearing bush to the middle tube, which is realized as a plastic tube, for example, the hollow tube arrangement is provided with a coupling element which is connected to the middle tube in a co-rotating manner and which connects the bearing bush that can shift relative to the middle tube in the longitudinal direction of the hollow tube to the middle tube. The coupling element, which may be realized as a plastic overmold of the middle tube, forms the sliding partner for the bearing bush, which constitutes a compensation element.

A bearing bush that can shift relative to the middle tube in the axial direction can either be disposed at both ends of the middle tube or at only one end of the middle tube. Thus, length compensation is either realized at both sides or at one side.

In a specific embodiment of the roller blind arrangement according to the invention, the bearing bush has a guiding element which engages into a guiding track of the coupling element or of the middle tube in order to clearly define the position of the bearing bush relative to the middle tube and also to define the maximum travel between the bearing bush and the middle tube. The length of the guiding track defines the maximum travel.

The guiding element preferably also serves to ensure that the bearing bush is securely connected to the middle tube. To this end, the guiding element may be formed by a hook-shaped resilient guiding tab whose hook portion engages into the guiding track of the coupling element or of the middle tube.

The hook-shaped resilient guiding tab preferably has a ramp or slope which facilitates introduction of the bearing bush into the coupling element or into the middle tube of the hollow tube arrangement by elastically deforming the guiding tab during assembly.

In an advantageous embodiment of the roller blind arrangement according to the invention, the bearing bush that can shift relative to the middle tube in the longitudinal direction of the hollow tube has an outer profile which engages into a corresponding inner profile of the coupling element or of the middle tube so as to ensure that the bearing bush is retained in the coupling element or in the middle tube in a co-rotating manner. Alternatively, a moment of torsion can be transmitted between the bearing bush and the middle tube via the above-described at least one guiding tab only, which is retained in the guiding track of the coupling element or of the middle tube without play in the circumferential direction of the bearing bush, in particular.

In general, one guiding tab may be provided, which engages into a guiding track of the coupling element, or multiple guiding tabs may be provided, which are distributed in the circumferential direction and each of which engages into a guiding track of the coupling element.

Preferably, the position of the bearing bush on the vehicle-attached mounting beam is clearly defined. For this purpose, the bearing bush that can shift relative to the middle tube in the longitudinal direction of the hollow tube may have an annular collar via which it is supported on a vehicle-attached support surface, which may be formed on the mounting beam, for example.

In a specific embodiment of the roller blind arrangement according to the invention, the bearing bush that can shift relative to the middle tube in the longitudinal direction of the hollow tube also serves to attach a winding spring which is connected to the mounting beam, i.e. to a vehicle-attached component, at one side and to the hollow tube arrangement at the other side. For this purpose, the bearing bush preferably has a recess and/or a protrusion which allows the winding spring to be mounted.

Alternatively or additionally, the lateral guiding tapes of the roller blind web can be realized as constant force springs and effect the winding of the roller blind web onto the winding shaft.

In particular, the mounting beam, which is surrounded by the hollow tube arrangement, is curved, which means that the roller blind web can have a curvature when in its extended state, said curvature following the curvature of a vehicle roof in the transverse direction of the roof. In this case, the hollow tube arrangement is also curved.

The roller blind web is preferably connected to the middle tube at an edge extending in the transverse direction of the roller blind, in particular in a central portion of the middle tube or in points along the middle tube, and it can be attached fixedly or it can move freely in the transverse direction of the roller blind through a groove/welting connection, for example.

The roller blind arrangement according to the invention may be a roller blind arrangement for shading a transparent roof portion of a motor vehicle. For instance, the roller blind arrangement may be part of a sunroof arrangement which has a displaceable transparent lid element by means of which a roof opening of the vehicle in question can be closed. In this case, the roller blind arrangement thus forms what is referred to as a sunroof roller blind arrangement.

Other advantages and advantageous embodiments of the subject-matter of the invention are apparent from the description, the drawing and the claims.

A preferred embodiment of a roller blind arrangement according to the invention is illustrated in a schematically simplified manner in the drawing and will be explained in more detail in the following description.

BRIEF DESCRIPTIONS OF THE DRAWINGS

DETAILED DESCRIPTION

Figure 1:
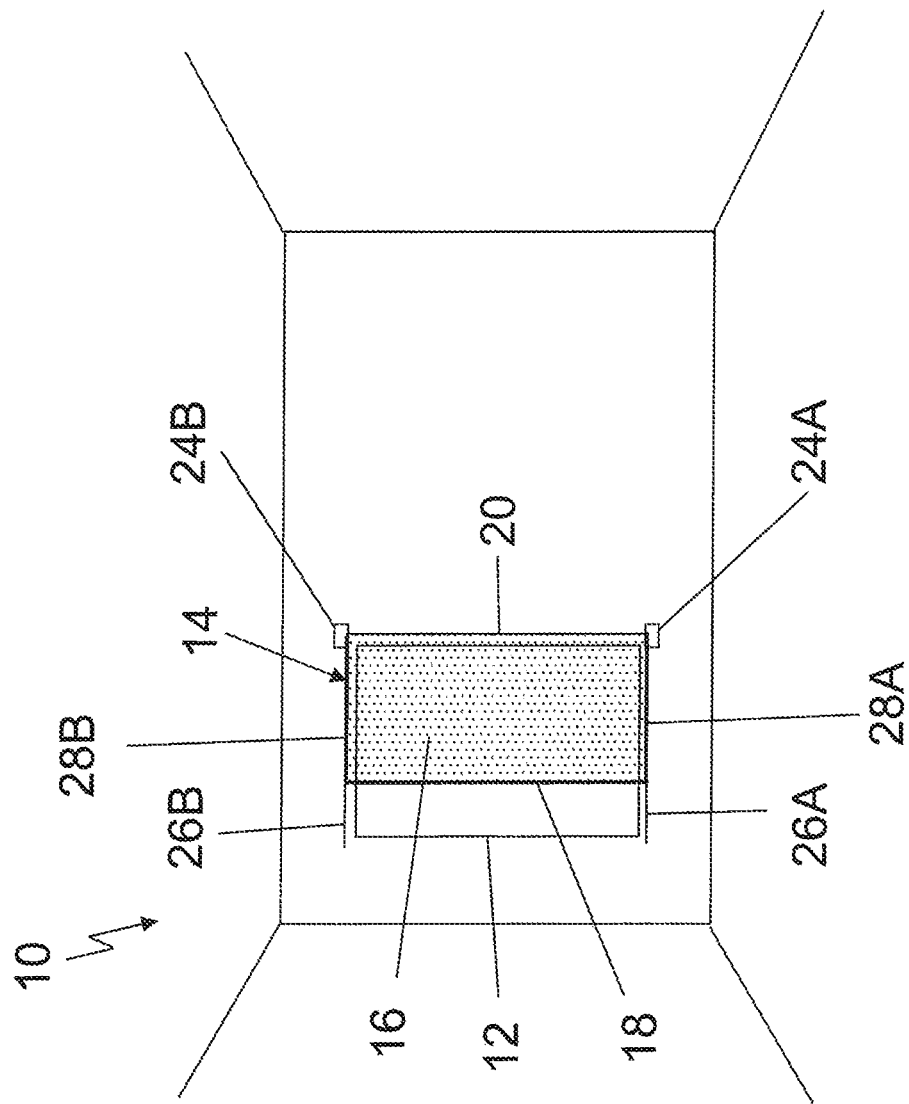
FIG. 1 is a top view of a vehicle roof having a roller blind arrangement according to the invention.

The drawing shows a vehicle roof 10 of a passenger vehicle not shown in further detail, vehicle roof 10 having a roof cutout 12 which can be closed or at least partially opened by means of a not shown transparent lid element.

Figure 2:
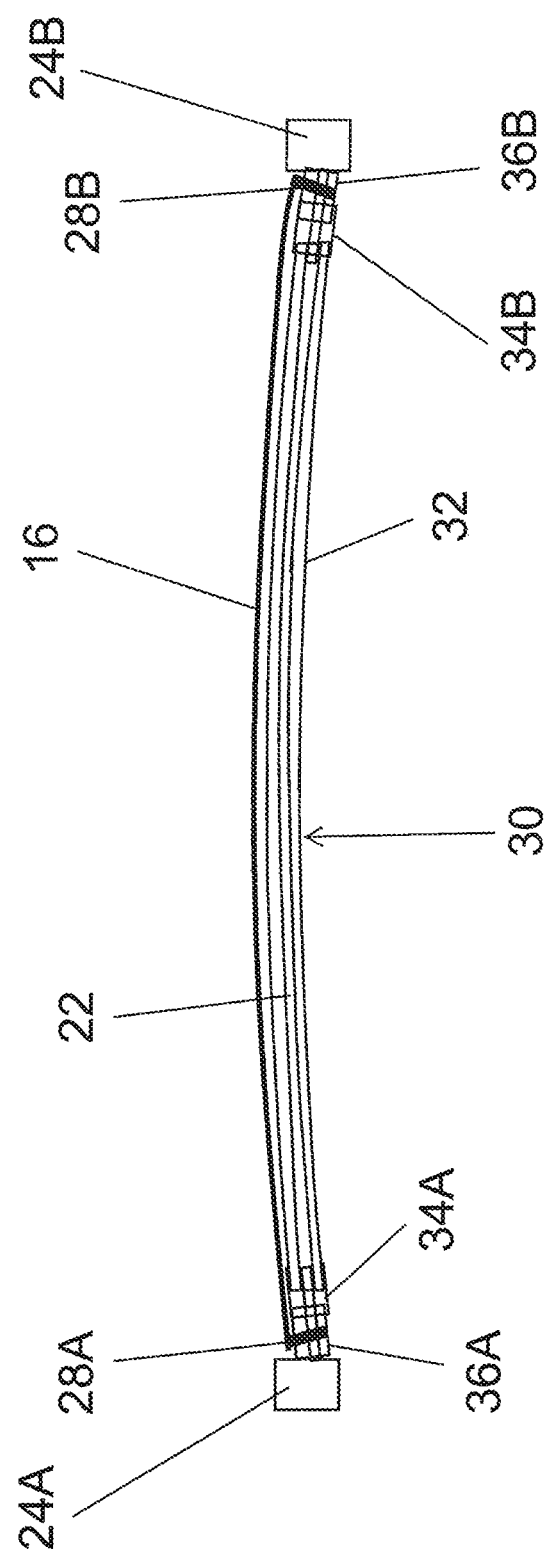
FIG. 2 is a schematic longitudinal section through a winding shaft of the roller blind arrangement.
Figure 3:
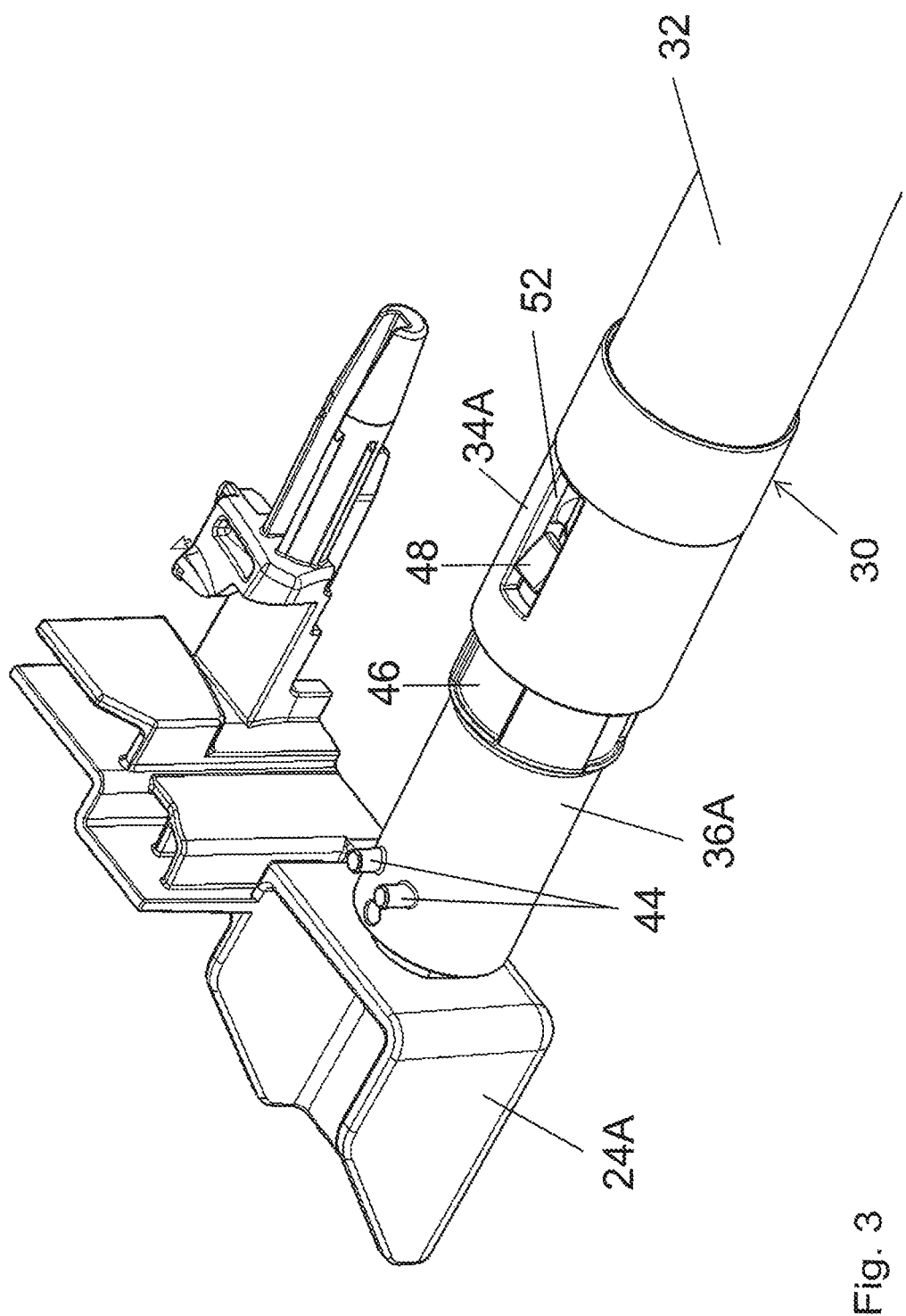
FIG. 3 is a perspective top view of a first bearing area of the winding shaft.
Figure 4:
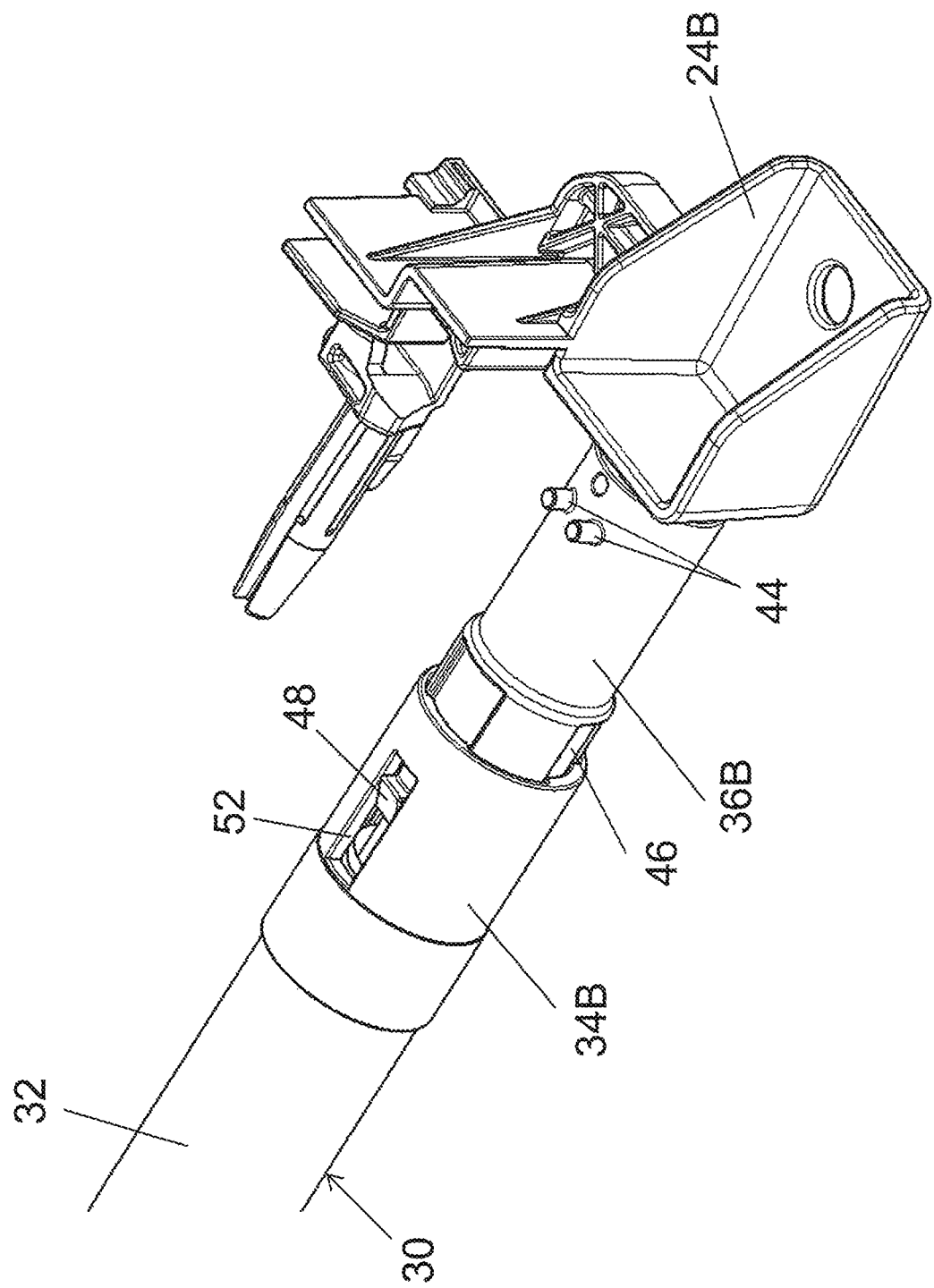
FIG. 4 is a perspective top view of a second bearing area of the winding shaft.
Figure 5:
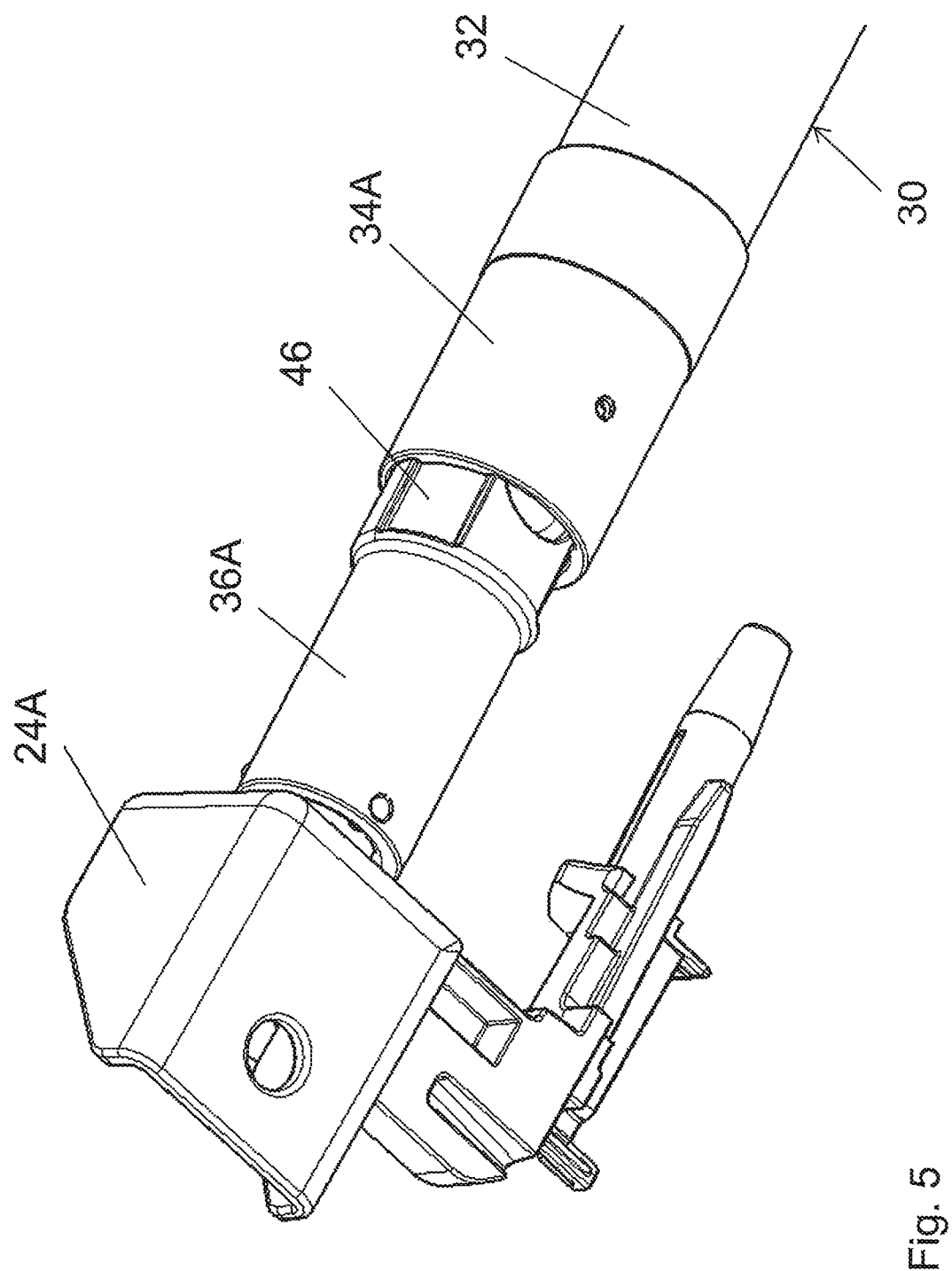
FIG. 5 is a perspective bottom view of the first bearing area.
Figure 6:
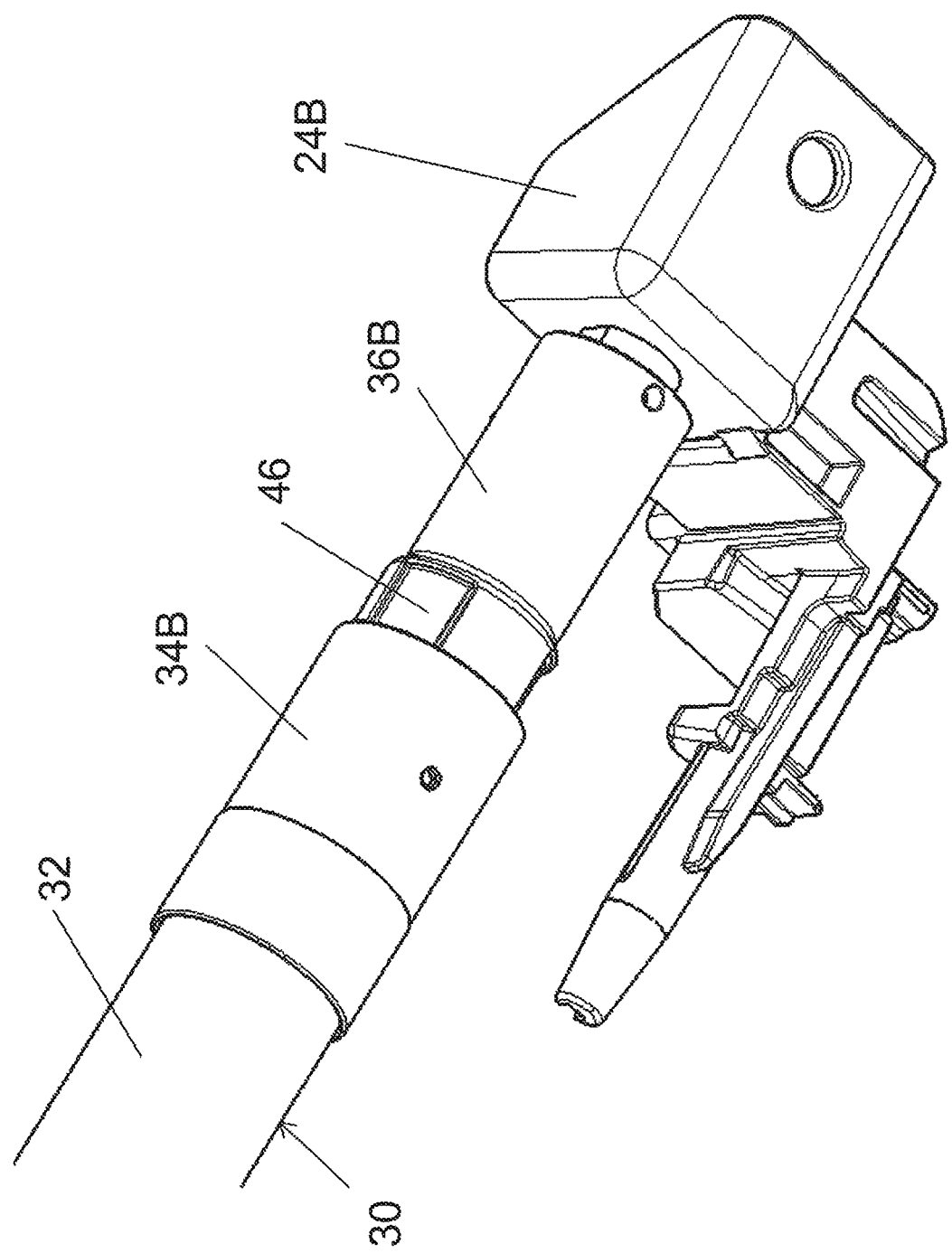
FIG. 6 is a perspective bottom view of the second bearing area.
Figure 7:
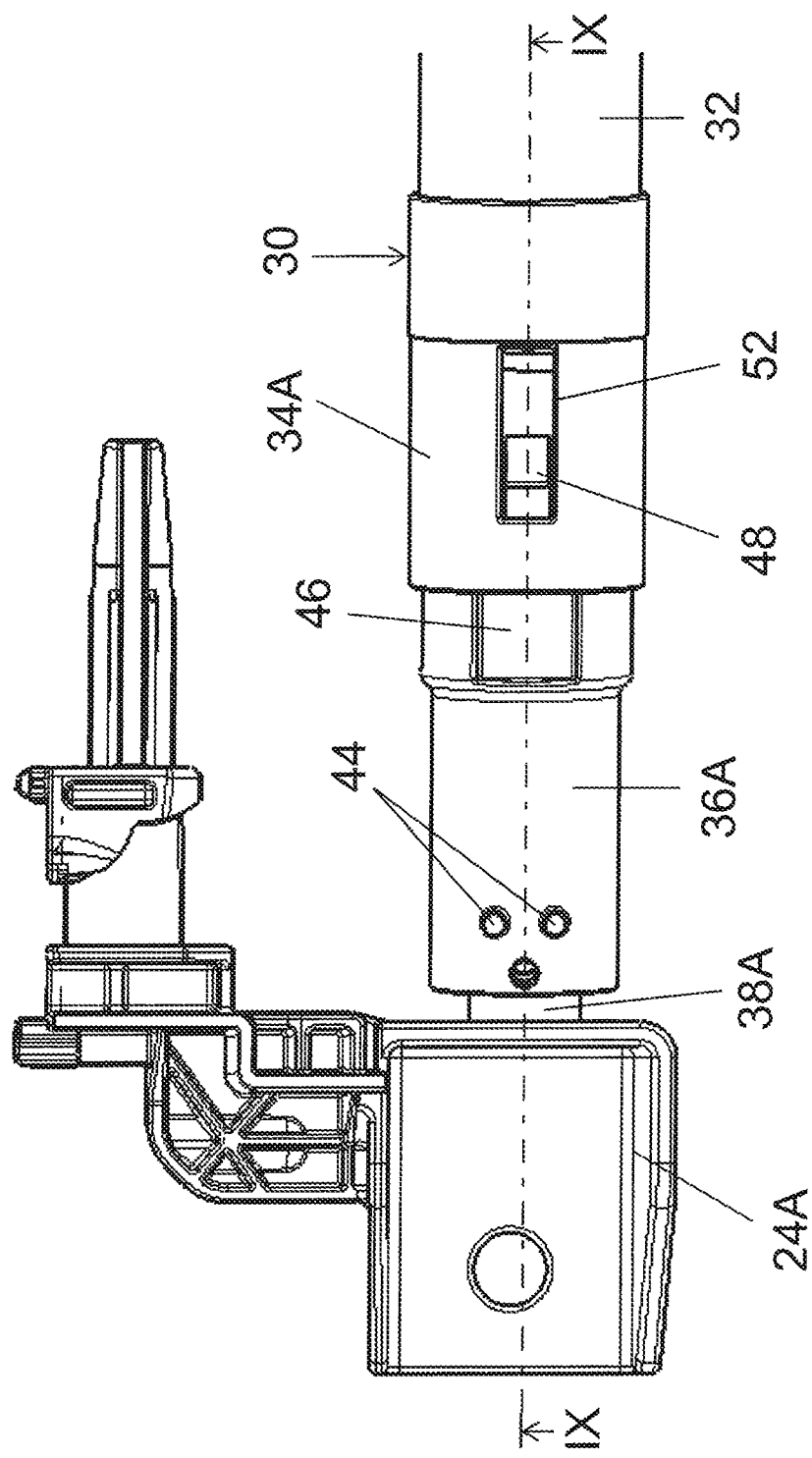
FIG. 7 is a top view of the first bearing area.
Figure 8:
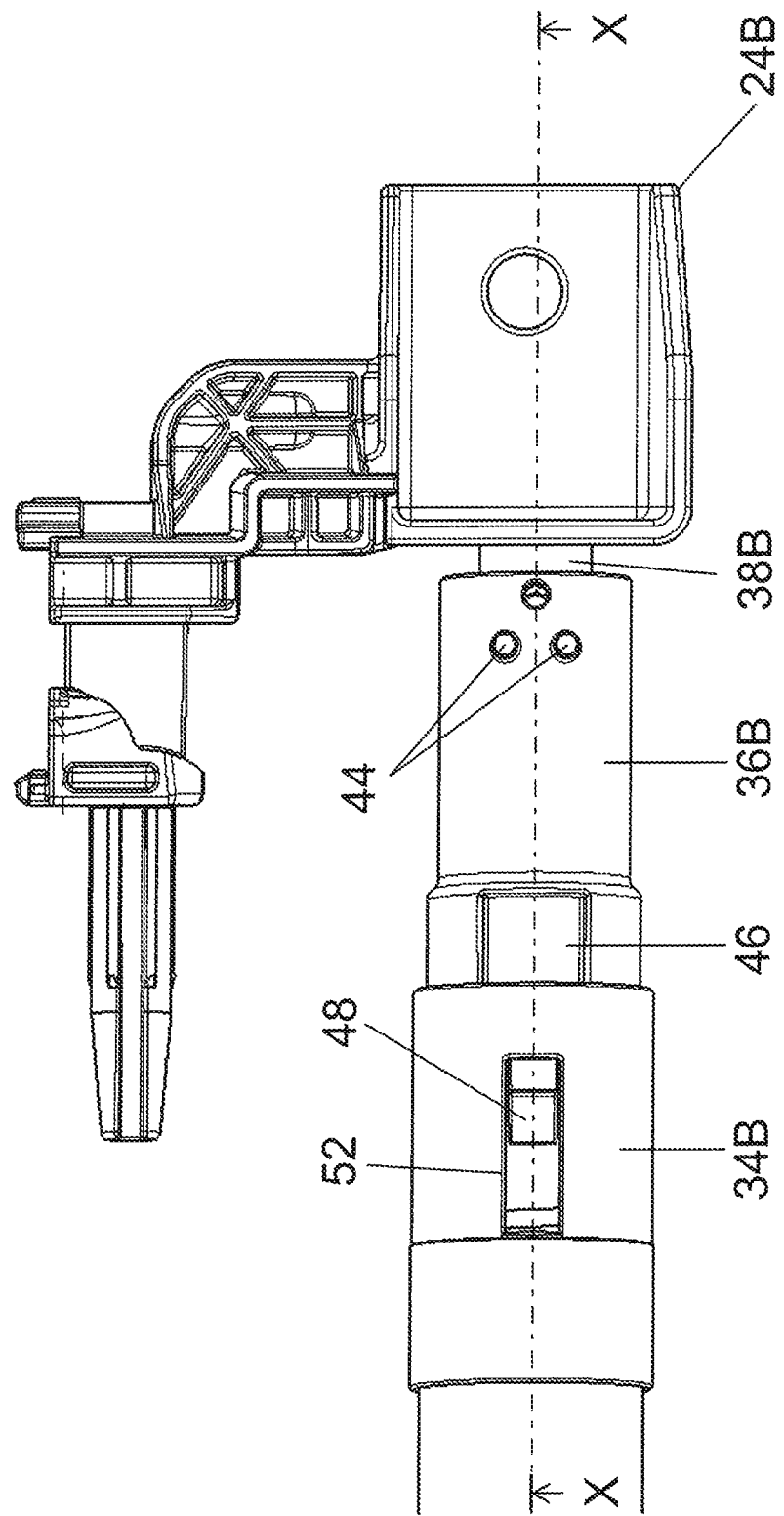
FIG. 8 is a top view of the second bearing area.

Vehicle roof 10 comprises a roller blind arrangement 14 as a shading element for roof cutout 12, roller blind arrangement 14 comprising a roller blind web 16 made of a foldable or windable opaque fabric. At its free edge, roller blind web 16 has a pull bar 18 which extends in the transverse direction of the vehicle. At its edge facing away from pull bar 18, roller blind web 16 is attached to a winding shaft 20 which extends in the transverse direction of the vehicle. Winding shaft 20, which is illustrated schematically in FIG. 2, is curved in the transverse direction of the vehicle and comprises a curved mounting beam 22 which is attached to the vehicle and which is connected to vehicle-attached bearing elements 24A and 24B on either side of a vertical longitudinal center plane of the roller blind. Bearing elements 24A and 24B are disposed on the rear sides of guiding rails 26A and 26B which extend in the longitudinal direction or in the pulling direction of roller blind web 16 and in which lateral edges of roller blind web 16 are guided via guiding tapes 28A and 28B which are connected to roller blind web 16.

Furthermore, winding shaft 20 has a flexible hollow tube arrangement 30 which surrounds mounting beam 22. Hollow tube arrangement 30 comprises a flexible plastic middle tube 32, which is realized as a corrugated tube and which is provided with plastic overmolds on its ends disposed on either side of the vertical longitudinal center plane of the roller blind, said overmolds forming coupling elements 34A and 34B and being disposed rigidly with respect to middle tube 32. Via coupling elements 34A and 34B, bearing bushes 36A and 36B are connected to middle tube 32 on both sides. Bearing bushes 36A and 36B are mounted in a rotating manner on bearing journals 38A and 38B which are part of mounting beam 22 and formed on bearing elements 24A and 24B.

In addition to bilaterally disposed bearing journals 38A and 38B, mounting beam 22 comprises a central tube 40 which is connected to bearing journal 38A at one end via a connecting pin 42 and plugged onto bearing journal 38B at the other end.

Bearing bush 36A, which is disposed on the left with respect to the forward direction of travel of the vehicle in question and which is mounted in a rotating manner on mounting beam 22 or, more precisely, on its bearing journal 38A, has fixing pins 44 at its circumference, which serve to attach tape 28A of roller blind web 16. In its end portion facing away from bearing element 24A, bearing bush 36A has, at the circumference, an outer profile 46 which engages into a corresponding inner profile of coupling element 34A, whereby a co-rotating connection is established between bearing bush 36A and coupling element 34A and middle tube 32. Outer profile 46 thus forms outer gear teeth which engage into inner gear teeth of coupling element 34A.

Furthermore, bearing bush 36A comprises a hook-shaped resilient guiding tab 48 which extends in the axial direction and whose hook portion 50 engages into a guiding track 52 when in the mounted position, which is illustrated in the drawing, said guiding track 52 being oriented axially with respect to winding shaft 20 and being formed in the manner of a window on the plastic overmold, i.e. coupling element 34A. Guiding tab 48 or, more precisely, hook portion 50 of guiding tab 48 has an introduction slope 54 which facilitates introduction of bearing bush 36A into coupling element 34A during assembly.

On its front side facing away from bearing element 24A, bearing bush 36A has an annular collar 56 which faces radially inward and which is supported on bearing journal 38A at one side and on an annular collar 58 of connecting pin 42 of mounting beam 22 at the other side, thereby defining an exact position of bearing bush 36A with respect to the axial direction of winding shaft 20.

As is implicitly apparent from the description above and from the drawing, bearing bush 36A is disposed for co-rotation with middle tube 32 because of outer profile 46, which engages into the inner profile of coupling element 34A, but can shift relative to middle tube 32 in the axial direction, whereby changes in the length of middle tube 32 due to temperature and/or humidity fluctuations can be compensated.

Figure 9:
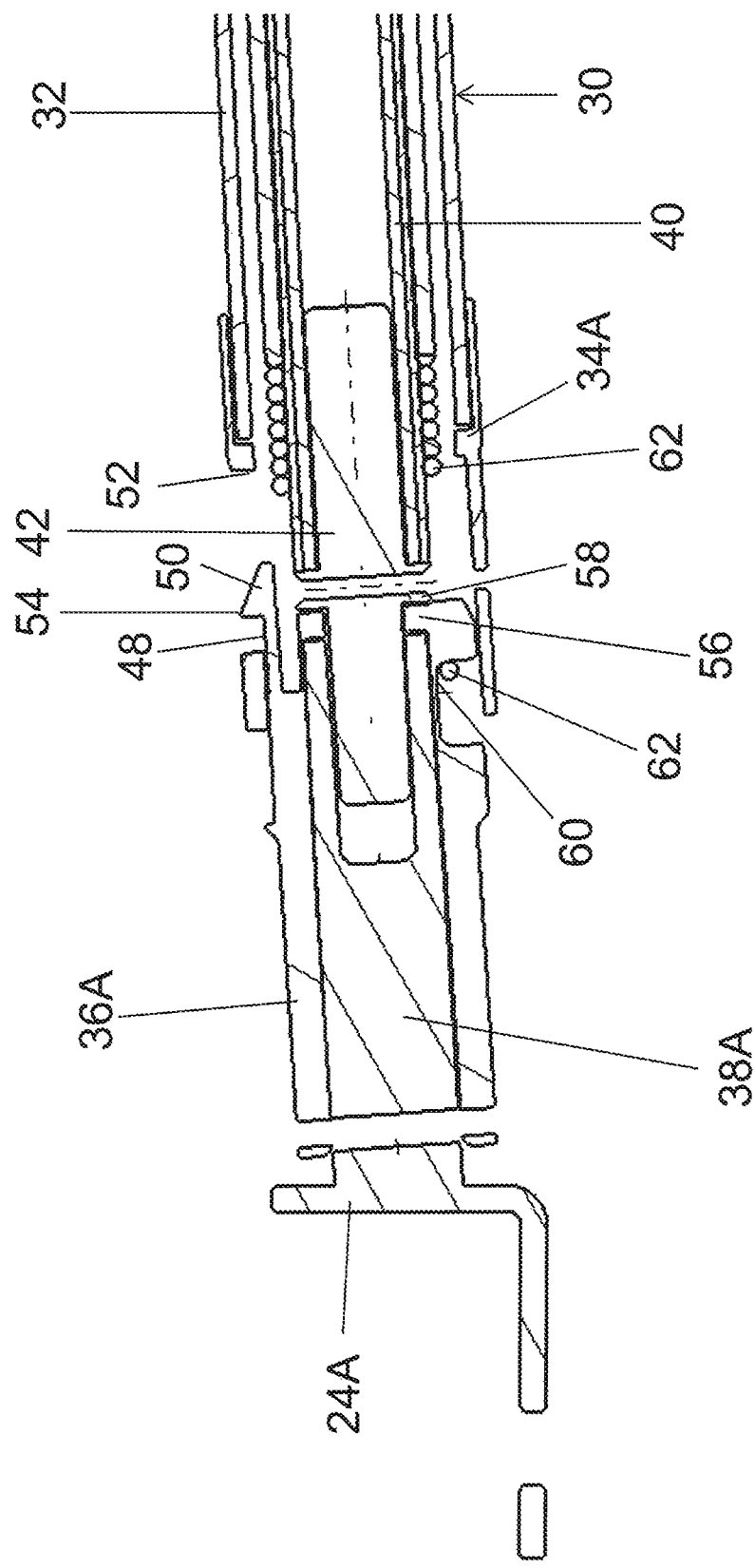
FIG. 9 is a longitudinal section through the first bearing area along line IX-IX in FIG. 7.
Figure 10:
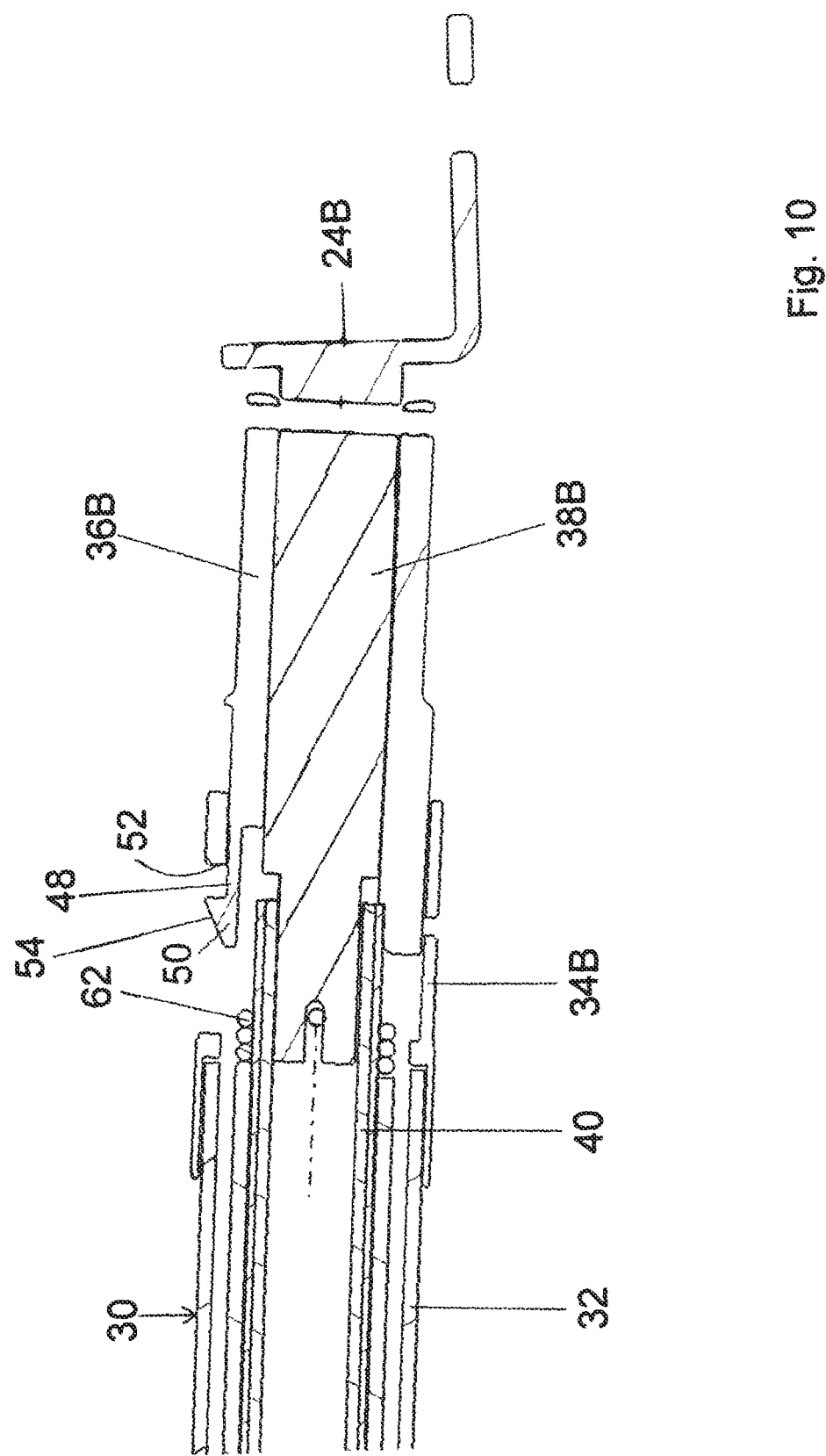
FIG. 10 is a longitudinal section through the second bearing area along line X-X in FIG. 8.
Figure 11:
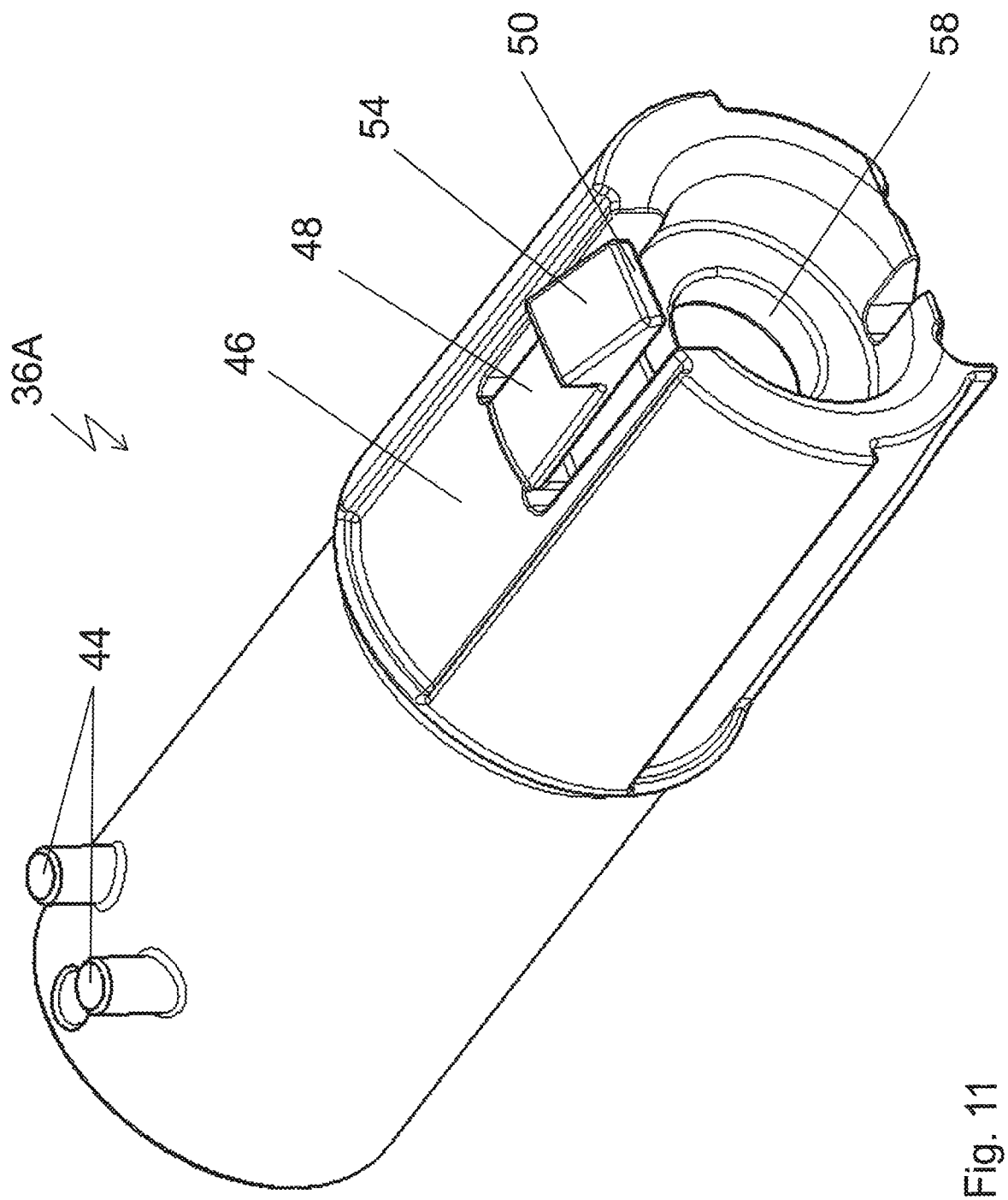
FIG. 11 is a perspective top view of a bearing bush of the first bearing area.
Figure 12:
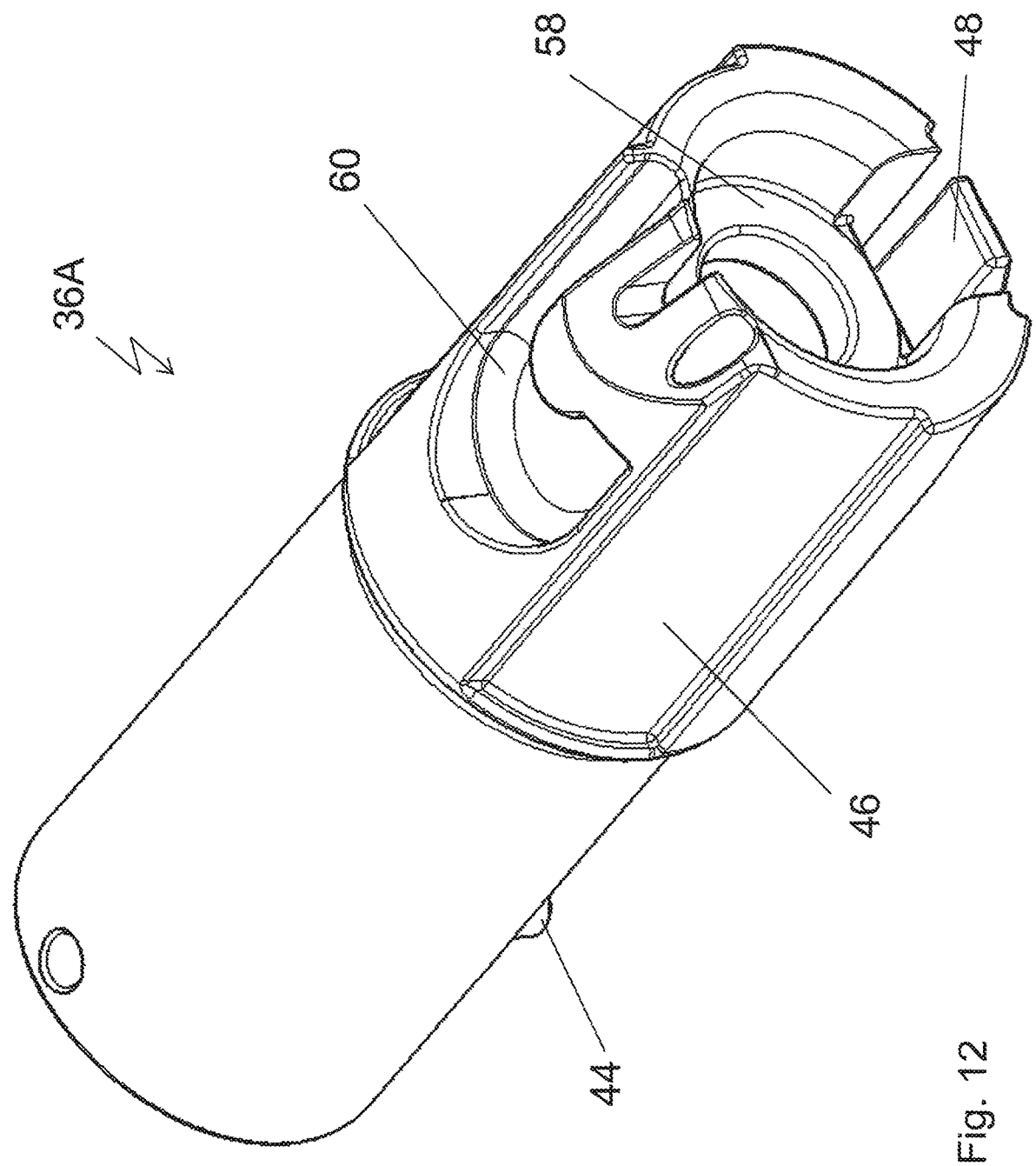
FIG. 12 is another perspective view according to FIG. 11, showing the bearing bush in a position rotated by 180°.
Figure 13:
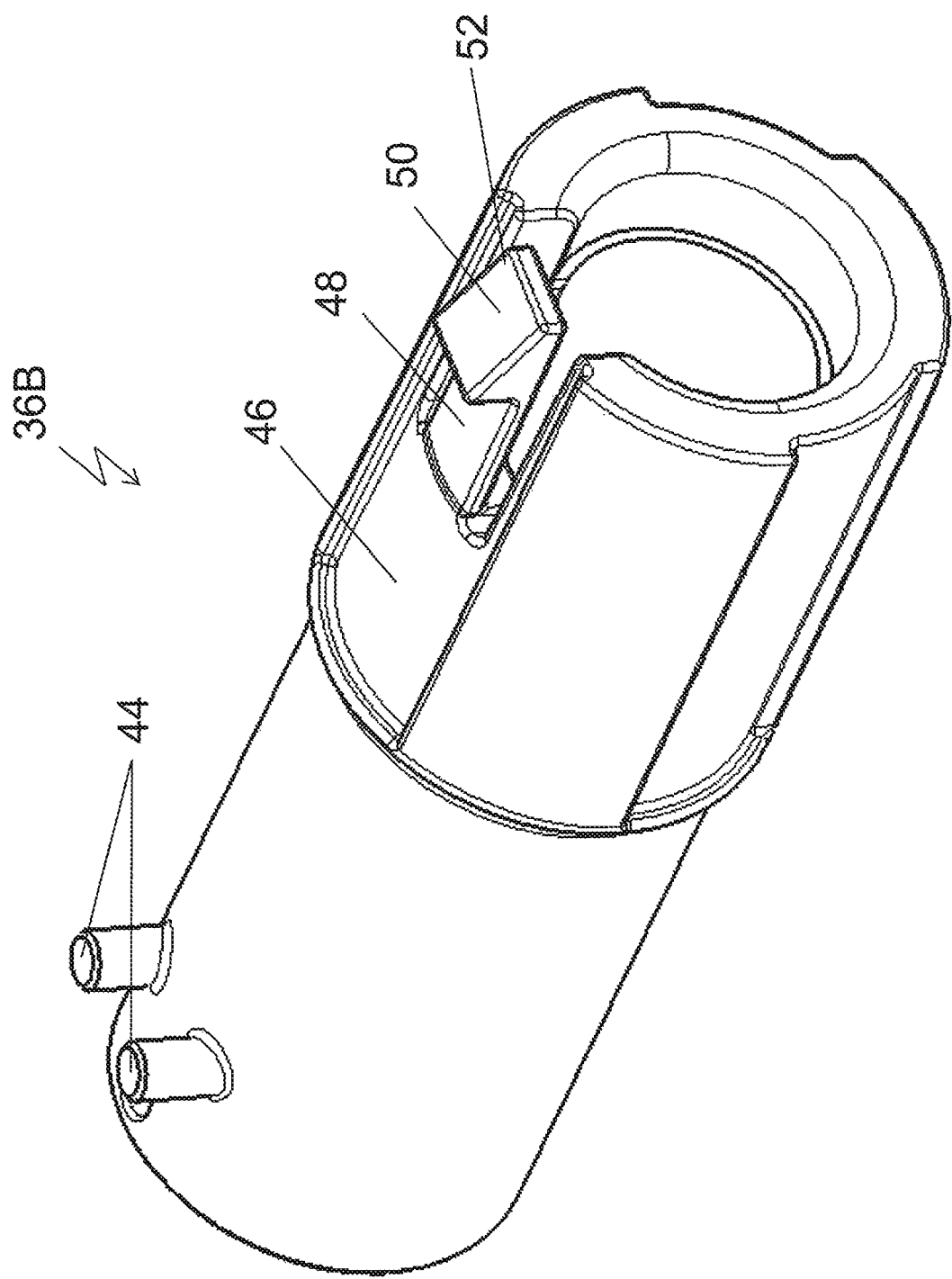
FIG. 13 is a perspective top view of a bearing bush of the second bearing area.

As can be gathered from FIGS. 9 and 12, in particular, bearing bush 36A has, at its circumference, a mount 60 which delimits a nose-like protrusion and which serves to mount a winding spring 62 which, as a coil spring, is guided along central tube 40 as far as to bearing journal 38B of mounting beam 22, where its end facing away from bearing element 24A is mounted in a vehicle-attached manner. Winding spring 62 is pre-loaded in such a manner that hollow tube arrangement 30 is subject to permanent pre-load in the winding direction of roller blind web 16. This ensures that roller blind web 16 is automatically wound onto winding shaft 20 when pull bar 18 is released.

Bearing bush 36B, which is mounted in a rotating manner on bearing journal 38B, largely corresponds to bearing bush 36A, but differs from the latter in that it does not have a mounting feature for winding spring 62 in the form of a mount or the like, nor does it have an annular collar projecting inward in the direction of its axis. Like bearing bush 36A, however, bearing bush 36B has fixing pins 44 for guiding tape 28B, an outer profile 46 engaged with an inner profile of coupling element 34B, and a guiding tab 48 engaging into a window-like guiding track 52 of coupling element 34B and having a hook portion 50 and an introduction slope 52. Thus, bearing bush 36B is connected for co-rotation with coupling element 34B, i.e. with middle tube 32 of hollow tube arrangement 30, while being able to shift in the axial direction relative to middle tube 32 in order to compensate changes in the length of middle tube 32.

REFERENCE SIGNS 10 vehicle roof
12 roof cutout
14 roller blind arrangement
16 roller blind web
18 pull bar
20 winding shaft
22 mounting beam
24A, B bearing element
26A, B guiding rail
28A, B guiding tape
30 hollow tube arrangement
32 middle tube
34A, B coupling element
36A, B bearing bush
38A, B bearing journal
40 central tube
42 connecting pin
44 fixing pins
46 outer profile
48 guiding tab
50 hook portion
52 guiding track
54 introduction slope
56 annular collar
58 annular collar
60 mount
62 winding spring

The invention claimed is:

1. A roller blind arrangement for a motor vehicle, the roller blind arrangement comprising:
   a roller blind web which has guiding tapes at its lateral edges on either side of a longitudinal center plane of the roller blind,
   a winding shaft onto which the roller blind web can be wound or from which the roller blind web can be unwound and which comprises a flexible hollow tube arrangement penetrated by a mounting beam configured for attachment to the vehicle and comprising a flexible middle tube which is provided with bearing bushes in a co-rotating manner on both ends, each guiding tape of the roller blind web being attached to one of the bearing bushes,
   wherein at least one of the bearing bushes in an assembled state can shift relative to the middle tube in a longitudinal direction of the flexible hollow tube arrangement, and
   wherein the middle tube is provided with a plastic overmold coupling element at each end which are fixedly connected to the middle tube, the bearing bushes being connected to the middle tube via the coupling elements, and
   wherein the at least one of the bearing bushes that can shift relative to the middle tube has an outer profile which engages into an inner profile of each plastic overmold coupling element or of the middle tube.

2. The roller blind arrangement according to claim 1, wherein each plastic overmold coupling element is connected to the middle tube in a co-rotating manner, each plastic overmold coupling element connecting the at least one bearing bush that can shift relative to the middle tube in the longitudinal direction of the flexible hollow tube arrangement.

3. The roller blind arrangement according to claim 1, wherein the at least one of the bearing bushes comprises at least one guiding element which engages into a guiding track of each plastic overmold coupling element or of the middle tube.

4. The roller blind arrangement according to claim 3, wherein the at least one guiding element is formed by a hook resilient guiding tab.

5. The roller blind arrangement according to claim 1, wherein the at least one of the bearing bushes that can shift relative to the middle tube in the longitudinal direction of the flexible hollow tube arrangement has an annular collar via which the bearing bush is supported on a support surface configured for attachment to the vehicle.

6. The roller blind arrangement according to claim 1, wherein a winding spring is attached to the at least one of the bearing bushes that can shift relative to the middle tube in the longitudinal direction of the flexible hollow tube arrangement.

7. The roller blind arrangement according to claim 1, wherein the mounting beam is curved.

* * * * *